Feb. 11, 1969     L. F. PERWAS     3,426,436
PROJECTED MEASURING SURFACE GAGE BLOCKS
Filed April 23, 1965

INVENTOR.
LUDWIG F. PERWAS

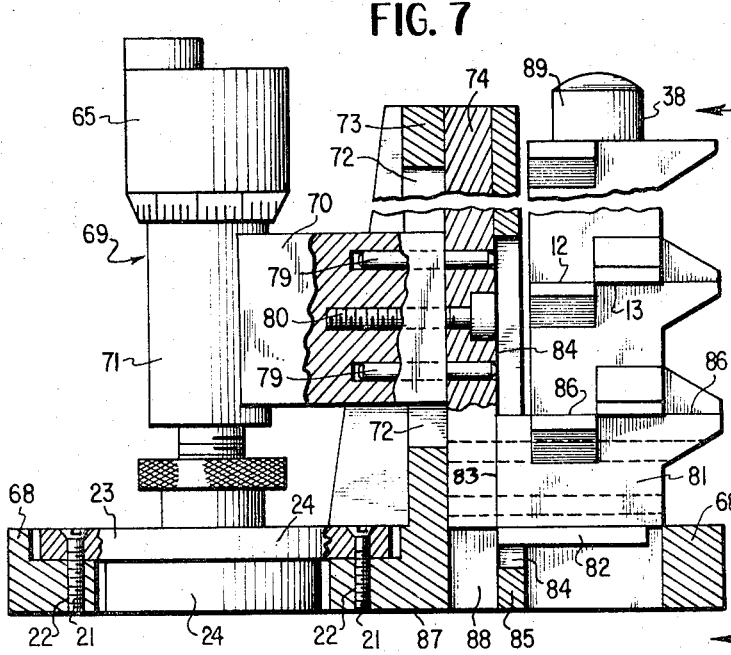
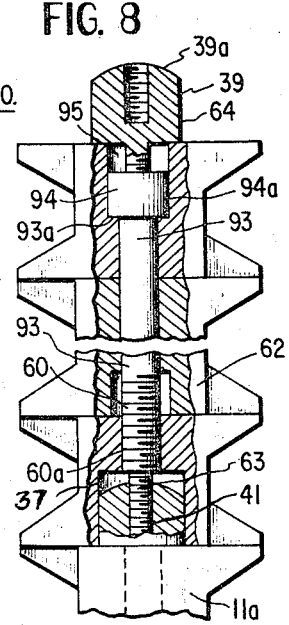
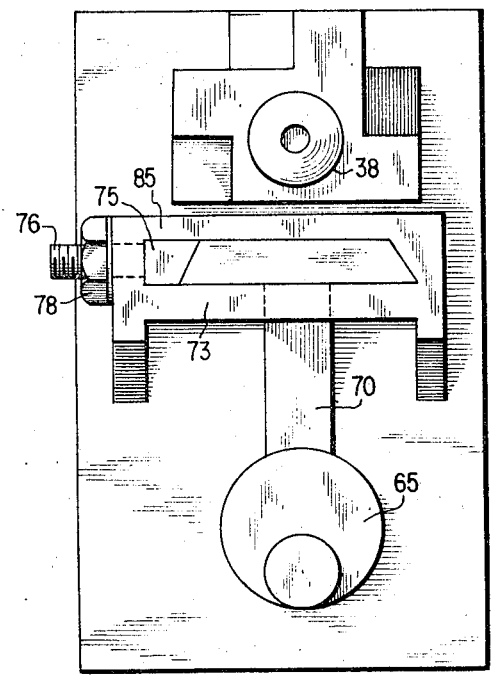
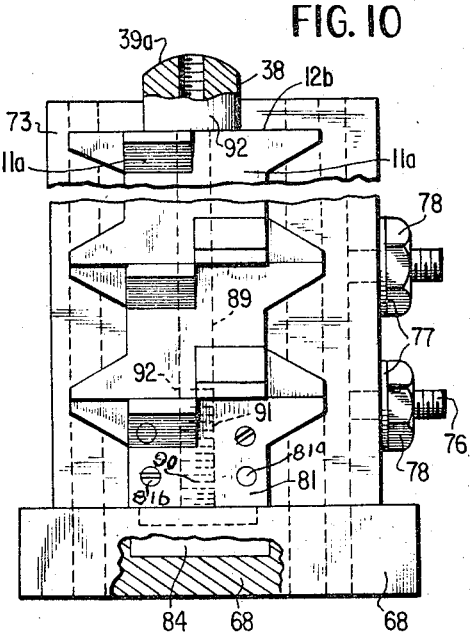

United States Patent Office 3,426,436
Patented Feb. 11, 1969

3,426,436
PROJECTED MEASURING SURFACE
GAGE BLOCKS
Ludwig F. Perwas, Mountainview Ave.,
Orangeburg, N.Y. 10962
Continuation-in-part of application Ser. No. 70,213, Nov. 18, 1960. This application Apr. 23, 1965, Ser. No. 450,452
U.S. Cl. 33—168    4 Claims
Int. Cl. G01b 5/00, 5/20, 5/28

ABSTRACT OF THE DISCLOSURE

A gage block for planar height gages for taking height or distances of various specific positions on a workpiece above the working surface upon which the device is utilized to obtain dimensions of the workpiece by subtracting one height or distance from another. Vertical rows of alternated projected over and under surfaces with foolproof opposing angular surfaces to avoid taking erroroneous readings from a non-gage surface are provided for taking measurements off a workpiece. Specially designed into the gage block are alternated same plane precision projected gage surface on the sides that when the gage blocks are stacked form a vertical row of gage surfaces that provide for the co-acting operation of a precision scriber setting unit.

---

My invention, a continuation in part application of my pending application filed Nov. 18, 1960, Ser. No. 70,213, now Patent No. 3,180,029, is related to new and useful improvements in gage blocks.

An important object of my invention is to provide a gage unit that will reduce wear of the measuring surfaces, caused by the under-surface attachment used with similiar devices.

A related object of my invention is to provide a gage unit that will form easily accessible same plane undersurface and over-surface gage areas.

Another object of my invention is to eliminate the extra under-surface thimble micrometer scale of some similiar devices.

Still another object of my invention is to eliminate the chance error that can occur by indicating a parallel non-measuring surface of similar devices.

One of the most important objects of my invention is to provide an under and over surface gage block that permits the stacking of multiple off-set projected same plane gage stacks.

With the above and other objects and advantages in view, the invention consists of the novel, new and unique construction more fully hereinafter described, claimed and illustrated in the accompanying drawings.

FIGURE 7 is a longitudinal partial sectional view of a modification of the new device, illustrated in FIGURES 4, 5 and 6 showing the utilization of the gage block depicted in FIGURE 1.

FIGURE 8 is a fragmentary sectional view rotated ninety degrees showing the method of securing the gage blocks of an extension multiple gage stacking unit.

FIGURE 9 is a top plan view of the device shown in FIGURE 7.

FIGURE 10 is a plan view taken along the line 10—10 of FIGURE 7.

Figure 1:
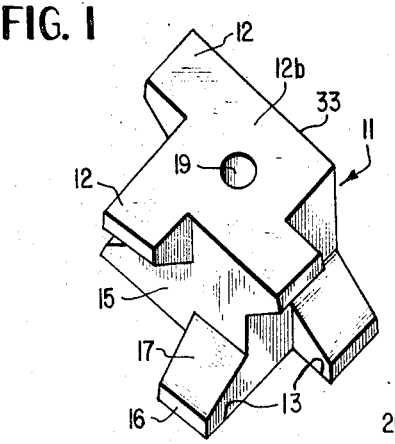
FIGURE 1 is a three dimensional view of a modified form of the original off-set projected same plane gage ring or block shown in FIGURE 2 of this application.
Figure 2:
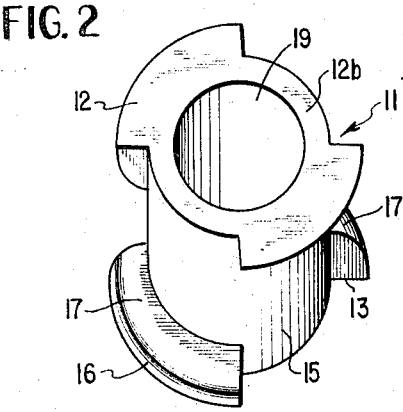
FIGURE 2 is a three dimensional view of the gage block or ring illustrated in my said pending application, Ser. No. 70,213.

Referring more in detail to the drawing, a gage body 11 having off-set projected over measuring surfaces 12 and under projected measuring surfaces 13 of the gage body 15. Providing materially depth for the gage surfaces 12 and 13 are narrow lands 16 having an adjacent non-parallel surface 17 to assure that only the measuring surfaces can be indicated parallel. This makes the device foolproof as the projected gage surfaces are the only surfaces that are parallel to each other in the gage column 18. Also incorporated within the gage body 15 is an adaptable bore 19 to facilitate assembly of said gage blocks.

Figure 4:
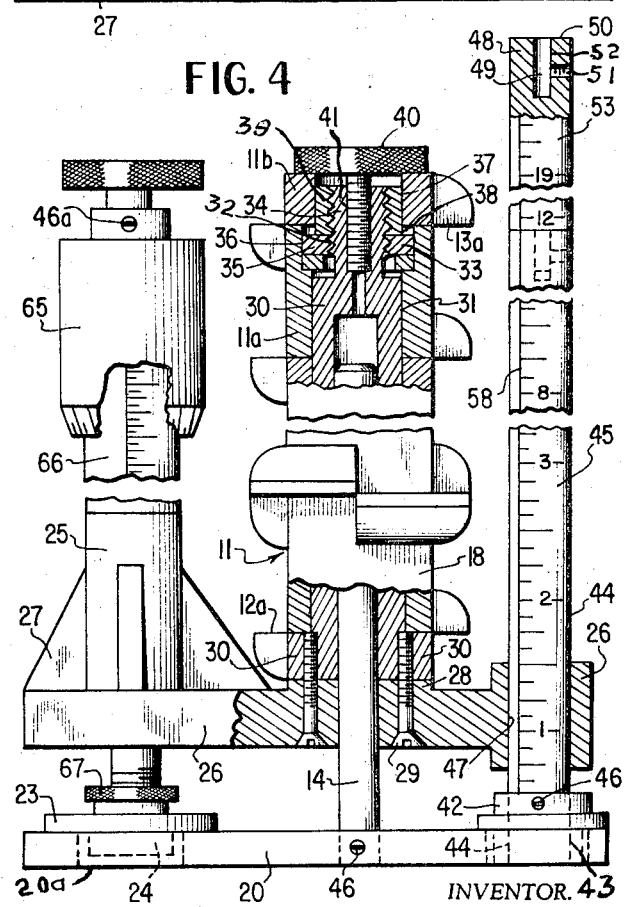
FIGURE 4 is a longitudinal partial view of another modified form of the device, illustrated in the previous mentioned pending patent application, Ser. No. 70,213, depicting the use of the gage block shown in FIGURE 3.

A device shown in FIGURE 4 of this application, relative to those shown in my said pending application, is secured to a stationary base 20 by flat head screws 21 passing through holes in the adapter flange 23 of the adapter 24, as in FIGURE 7, before engaging corresponding threaded bores 22 in the base 26 of said FIGURE 4 while integrally attached to a slide tube 25 is a floating base 26 with reinforcement ribs 27.

The adapter 24 is clearly illustrated in FIGURE 7 to be secured to base 68 as stated in the preceding paragraph by flat head screws, threaded bores 22, etc.

Rigidly attached to the integral floating base pad 28 by flat head screws 29, in FIGURE 4, is a gage sleeve 30, having an over-surface measuring projections 12a and a free fitting elongated diameter 31 for engaging several gage blocks 11 which are secured firmly in place by the upper threaded end 34 of said gage sleeve 30 passing through the lockwasher 33 bore and engaging the threaded bore 32 of a locknut 35 that sets in a counterbore 36 in the uppermost gage block 11a thereby forming a gage column 18.

A partial gage block 11b having under measuring surface 13a is attached to the uppermost mounting surface 12b of the basic gage column 18 by its 11b inside diameter 37 engaging a corresponding diameter 38 of the alignment bushing 39 and a knurl screw 40 engaging a threaded hole 41 in the top of the gage sleeve 30.

Movably attached to the stationary base 20, in the same manner as the adapter 24 is a scale rod anchor adapter 42 having a precision bore 43 engaging a precision diameter 44 of an alignment scale rod 45 that is firmly secured to said adapter 42 by the set screw 46 which allows it 44 to slidably engage a precision bore 47 in the said floating base 26, and still permit the scale rod to be properly adjusted if necessary.

The other end 48 of the alignment scale rod 45 has a bore 49 and an upper precision face 50, that is flat and parallel to the bottom surface 20a of the stationary base 20 and the wall 52 of the said bore 49 is square to said face 50.

An extension scale rod 53 having aplurality of individual vertical graduated alignment lines in conjunction with graduated varying scale ranges 54, 55, 56 and 57 is mounted on the upper precision face 50 of scale rod 45, after first choosing the proper range and aligning the graduated vertical alignment lines 58, by the reduced diameter 59 and precision face 61 of said extension scale rod 53 engaging corresponding bore 49 and face 50 of the basic scale rod 45.

The first stack range numbered twelve to eighteen inches vertically positioned on the plurality range extension rod 53 is represented by the numeral 54, the second stack range of nineteen to twenty-four by the numeral 55, the third stack range of twenty-five to thirty-one by the numeral 56, and the fourth stack range of thirty-two to thirty-eight by the numeral 57.

The first number of each of the four mentioned ranges designates the uppermost full inch height of the surface upon which the scale rod sets, while the last number is one less than the actual height the gage column has been extended. The basic gage column numerical graduation of the scale rod full inches is also one less than the actual basic gage column height. The multiple gage extension stacks although shown here to be six inches in length may vary accordingly.

Figure 3:
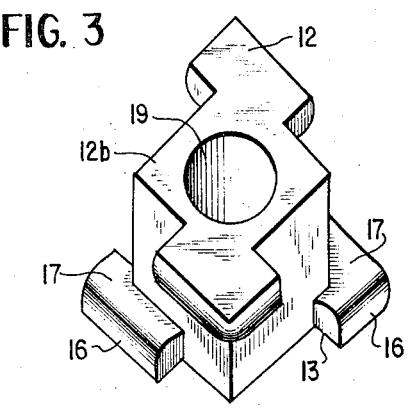
FIGURE 3 is a three dimensional view of another modification of the gage block shown in FIGURE 2.
Figures 5, 6:
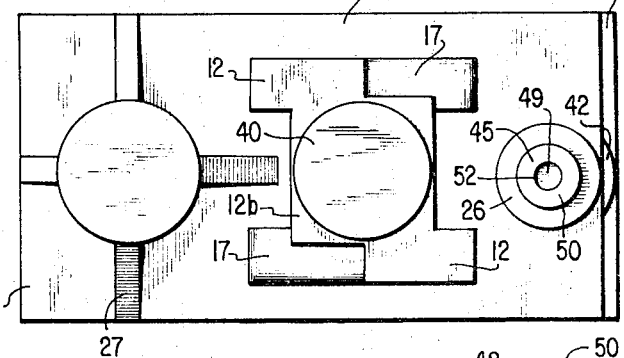
FIGURE 5 is a top plan view of FIGURE 4.
FIGURE 6 is a bottom plan view of an extension alignment scale rod graduated in inches. The top of extension scale rod 53 and basic scale rod 45 are similiar to provide for the continuous extending of said scale rods.

The gage column of FIGURE 4 is extended by disengaging the knurl screw 40 and then removing the partial gage block 11b before adding a gage stack similiar to the one shown in FIGURE 8 except that the gage stack is composed of the block shown in FIGURE 3. The bottom mounting surface 12b of the bottom gage block of the gage stack 62 engaging the top mounting surface 12b of the upper gage block 11a of the basic gage column 18 by the inside diameter 37 of the gage stack bottom block engaging the corresponding diameter 38 of the alignment bushing 39 and the threaded end 63 of the stacking bolt 64 engaging a corresponding threaded recess 41 in the top of the gage sleeve 30.

An extension scale rod 53 is properly added to the scale column for each multiple gage stack 62 that is added to the gage column by choosing the scale range according to the height the relative additional gage stack is above the flat surface upon which the device is being utilized.

Referring to the drawings the tapered circular edge of the thimble 65 is graduated so that one complete revolution is equal to .025 of an inch, and the stationary graduated micrometer barrel sleeve 66 graduated to one inch by the conventional .025 of an inch, the zero graduated line of the thimble 65 is set in line with the zero graduated of the micrometer sleeve 66. I view the fact that the gage blocks are precisely one inch between measuring surfaces, they are set so that their checking under-surfaces and over-surfaces are relative full inches above the flat surface on which the device is being used, and this is brought about by means of the adjusting nut 67 and by indicating the precision top surface projections 12a of the gage sleeve 30 to a full inch or full inches above the flat surface when the thimble 65 zero graduation is set on the barrel sleeve 62 zero graduation. Furthermore, with the relative parts properly set, accurate micrometer readings and scribings can be made from or onto the parts on which the device is being used or mounted.

This is accomplished by first indicating the surface of the part to be checked with a standard dial indicator by setting the indicator ball point on the surface to be meausred and adjusting the sliding element of the standard height gage holding the dial indicator until the dial hand is set at zero. Taking care not to disturb the indicator zero setting the height gage is moved over to the planar gage device with the indicator point close to the gage column. The micrometer thimble 65 is then manipulated so that the gage column 18 moves vertically up or down until a gage measuring surface 12, 12a or 13 is relatively in line with the bottom of the ball of the indicator point which is carefully slid in to contact said measuring surface and then upon contact the micrometer thimble 65 is adjusted until the dial indicator hand is set on zero thereby setting the relative measuring surface of the device the same distance above the said flat surface as the surface of the part being checked.

Taking a reading from the bottom of a bore and substracting it from a reading taken from the top of the same bore will result in the actual numerical size of the bore. Taking a reading from the very bottom of a part and substracting it from the uppermost reading of the same part would result in the numerical overall size of the part.

In general substracting the lower reading above the flat surface upon which the part being inspected and the device is set on, from a reading that is further above said flat surface, will permit a person to measure the actual size of diameters, bores, lengths, depths, center hole distances, etc.

A stationary base 68, in FIGURE 7, having a micrometer device 69, as shown in my pending application, Ser. No. 70,213, less the gage blocks, is mounted by a plurality of screws 21 passing through holes in the adapter flange 23 of the adapter 24 to engage corresponding threaded bores 22 in the said base 68 including a lift bar 70 that is an integral part of the slide tube 71. The said lift bar 70 passes through a rectangular slot 72 in a rigid vertical rectangular column 73 having an elongated dovetail recess. A corresponding elongated dovetail slide 74 that is slidably held in place by the adjustments gib 75 which is regulated by the adjustment screws 76 that are firmly secured by lockwasher 77 and hexagon nut 78. The said lift bar 70 is aligned and held in place by the dowel pins 79 and rigidly secured to said dovetail gage slide 74 by the socket screw 80.

A partial gage block 81 with a resilient soft stop pad 82 and having a none gage side 83 extended for engaging an elongated rectangular recess 84 in the dovetail column wall 85 and secured to said dovetail slide 74 by dowel pins 81a and screws 81b so that projected gage surface 86 is parallel to the bottom face 87 of the base 68 and square to the vertical dovetail bearing surface 88. Full gage blocks 11 are stacked on said measuring surface 86 and secured in place by a bolt 89 engaging with its threaded end 90 a corresponding threaded bore 91 in the partial gage block 81 and the lower shoulder surface of the stacking alignment diameter 92 bearing against the over surface mounting area 12b of the top gage block 11a, thereby securing all the gage blocks rigidly in position forming a basic gage column.

The extension multiple gage block stacks depicted in FIGURE 8 are added to the basic gage column shown in FIGURES 7 and 10 the same way they are added to the basic gage column illustrated in FIGURE 4 as previously stated.

The gage blocks 11 of the multiple gage extension 62 are firmly held together by the threaded end 60 of the bolt 93 engaging a corresponding threaded bore 60a in the upper portion of the lowermost gage block 11 and the bolt head 94 engaging a counterbore 94a in the uppermost portion of the top gage block 11a while the shouldered face 93a is bearing against the bottom of said counterbore 94a when the bolt is tightened.

It is to be understood that the form of my invention, herewith shown and described, it to be taken as a preferred example of the same, and that various changes in the size, shape and arrangement of parts may be resorted to without departing from the scope of my invention, or the appended claims.

What is claimed is:

1. A gage block for use with planar height gages, said gage block comprising an integral gage body having an axial securing means and parallel planar first and second end portions, a plurality of first projections extending from said body, each of said first projections having a first projecting measuring surface coplanar with said first end portion and having a second projecting surface inclined with respect to its first projecting measuring surface in non-parallel relationship therewith and forming a non-measuring surface, a plurality of second projections extending from said body, each of said second projections having a first projecting measuring surface coplanar with said second end portion and having a second projecting surface inclined with respect to its first projecting measuring surface in non-parallel relationship therewith and forming a non-measuring surface, each of said first projections being spaced about said body and circumferentially offset from each of the remaining first projections, each of said projections being spaced about said body and circumferentially offset from each of the remaining second projections and circumferentially offset from each of said first projections.

2. A gage block as defined in claim 1, wherein said inclined projecting surfaces are outwardly curved.

3. In a setting instrument for height gages and the like comprising a plurality of individual gage blocks superimposed one above the other to form a stack, said individual gage blocks comprising an integral gage body having an axial bore and parallel planar first and second end portions, a plurality of first projections extending from said body, each of said first projections having a first projecting measuring surface coplanar with said first end portion and having a second projecting surface inclined with respect to its first projecting measuring surface in non-parallel relationship therewith and forming a non-measuring surface, a plurality of second projections extending from said body, each of said second projections having a first projecting measuring surface coplanar with said second end portion and having a second projecting surface inclined with respect to its first projecting measuring surface in non-parallel relationship therewith and forming a non-measuring surface, each of said first projections being spaced about said body and circumferentially offset from each of the remaining first projections, each of said projections being spaced about said body and circumferentially offset from each of the remaining second projections and circumferentially offset from each of said first projections; means extending through the bores of each block for firmly securing the blocks in superimposed relationship with the planar end portion of one block in contact with the planar end portion of the adjacent block, the measuring surfaces of said second projection of an upper first block being coplanar with the measuring surfaces of said first projections of a block immediately adjacent and below said first upper block and each successive block of the stack being rotatively offset with respect to its adjacent block such that the projecting measuring surfaces of one block are circumferentially offset from the measuring surface of the adjacent block.

4. A gage block as defined in claim 1, wherein said axial securing means is an axial bore.

References Cited

UNITED STATES PATENTS

| | | | |
|---|---|---|---|
| 2,562,935 | 8/1951 | Minch | 33—170 |
| 2,722,748 | 11/1955 | Triantos | 33—170 |
| 2,752,688 | 7/1956 | Sagona | 33—170 |
| 3,115,708 | 12/1963 | Roy | 33—170 X |
| 3,295,217 | 1/1967 | Barry | 33—170 |

HARRY N. HAROIAN, *Primary Examiner.*

U.S. Cl. X.R.

33—169